(12) United States Patent
Boos et al.

(10) Patent No.: US 11,084,019 B2
(45) Date of Patent: Aug. 10, 2021

(54) METHOD AND TOOL FOR INSTALLING REACTOR COMPONENTS

(71) Applicant: Johnson Matthey Public Limited Company, London (GB)

(72) Inventors: Jordan Boos, Ravenna, OH (US); Michael Hepworth, Ravenna, OH (US); Frank Podojil, Ravenna, OH (US); Justin Ware, Ravenna, OH (US)

(73) Assignee: JOHNSON MATTHEY PUBLIC LIMITED COMPANY, London (GB)

( * ) Notice: Subject to any disclaimer, the term of this patent is extended or adjusted under 35 U.S.C. 154(b) by 0 days.

(21) Appl. No.: 16/948,334

(22) Filed: Sep. 14, 2020

(65) Prior Publication Data

US 2021/0077979 A1   Mar. 18, 2021

Related U.S. Application Data

(60) Provisional application No. 62/899,195, filed on Sep. 12, 2019.

(51) Int. Cl.
B01J 19/00 (2006.01)
B01J 19/24 (2006.01)
B01J 19/32 (2006.01)

(52) U.S. Cl.
CPC ........ B01J 19/325 (2013.01); B01J 19/0073 (2013.01); B01J 19/2415 (2013.01)

(58) Field of Classification Search
CPC ........ B01J 19/00; B01J 19/0073; B01J 19/24; B01J 19/2415; B01J 19/32; B01J 19/325
See application file for complete search history.

(56) References Cited

U.S. PATENT DOCUMENTS

| | | |
|---|---|---|
| 7,906,079 B2 | 3/2011 | Whittenberger et al. |
| 8,721,973 B2 | 5/2014 | Whittenberger et al. |
| 9,643,150 B2 | 5/2017 | Whittenberger et al. |
| 9,751,073 B2 | 9/2017 | Whittenberger et al. |
| 10,099,198 B2 | 10/2018 | Whittenberger et al. |
| 2017/0333865 A1 | 11/2017 | Whittenberger et al. |

*Primary Examiner* — Natasha E Young
(74) *Attorney, Agent, or Firm* — Kevin M. Carroll

(57) ABSTRACT

The invention includes a reactor installation device comprising a flexible band, a first tab, a second tab, and a mechanical stop. The flexible band has a first end, a second end, a top edge and a bottom edge. The first tab is attached at or near the first end, the second tab is attached at or near the second end, and the both tabs are attached at or near the top edge of the flexible band. The mechanical stop is attached to the flexible band, the first tab, and/or the second tab, between the top edge and the bottom edge of the flexible band. The flexible band is capable of being bent into the shape of a circle by bringing the first and second tabs into contact. The invention also includes a method of inserting a skirt seal into a stackable structural reactor using the reactor installation device.

8 Claims, 3 Drawing Sheets

FIGURE 1: Reactor Installation Device
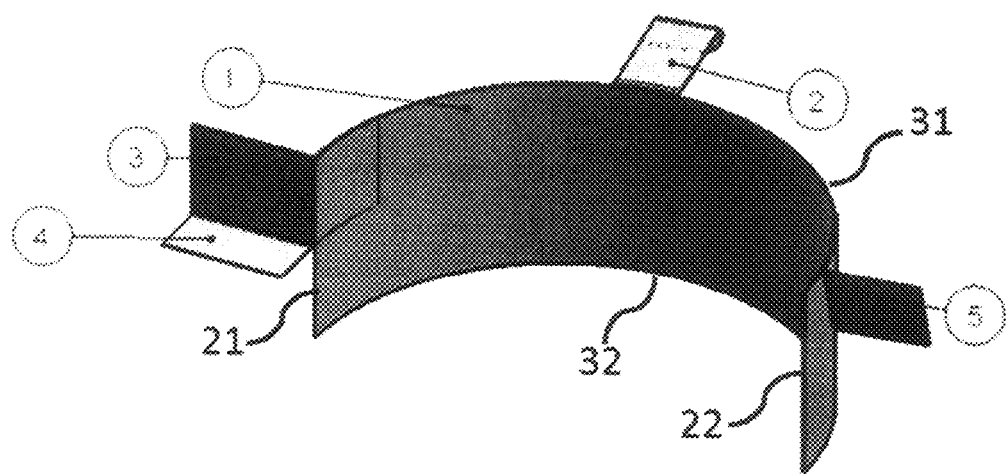

FIGURE 2: SKIRT SEAL
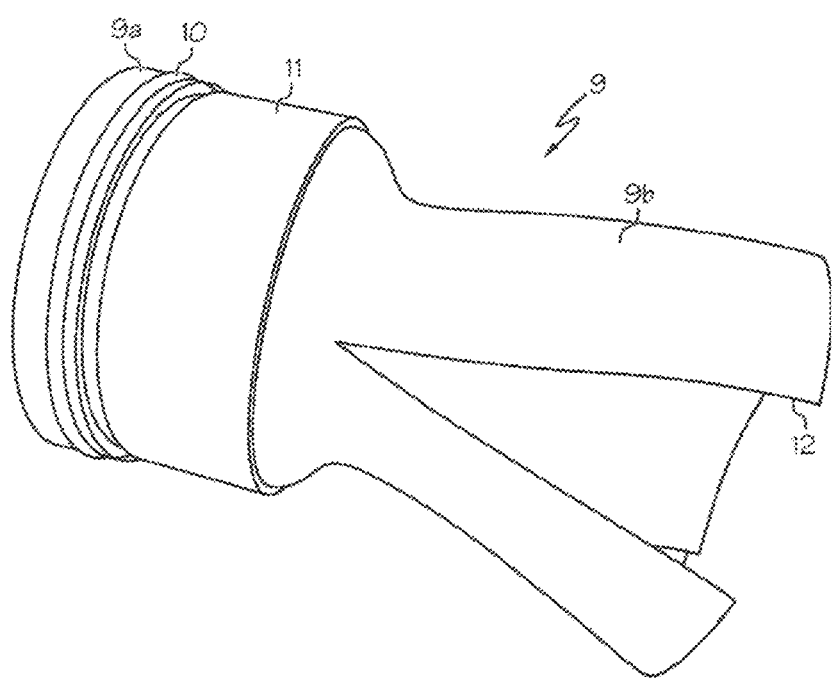

FIGURE 3: SSR REACTOR
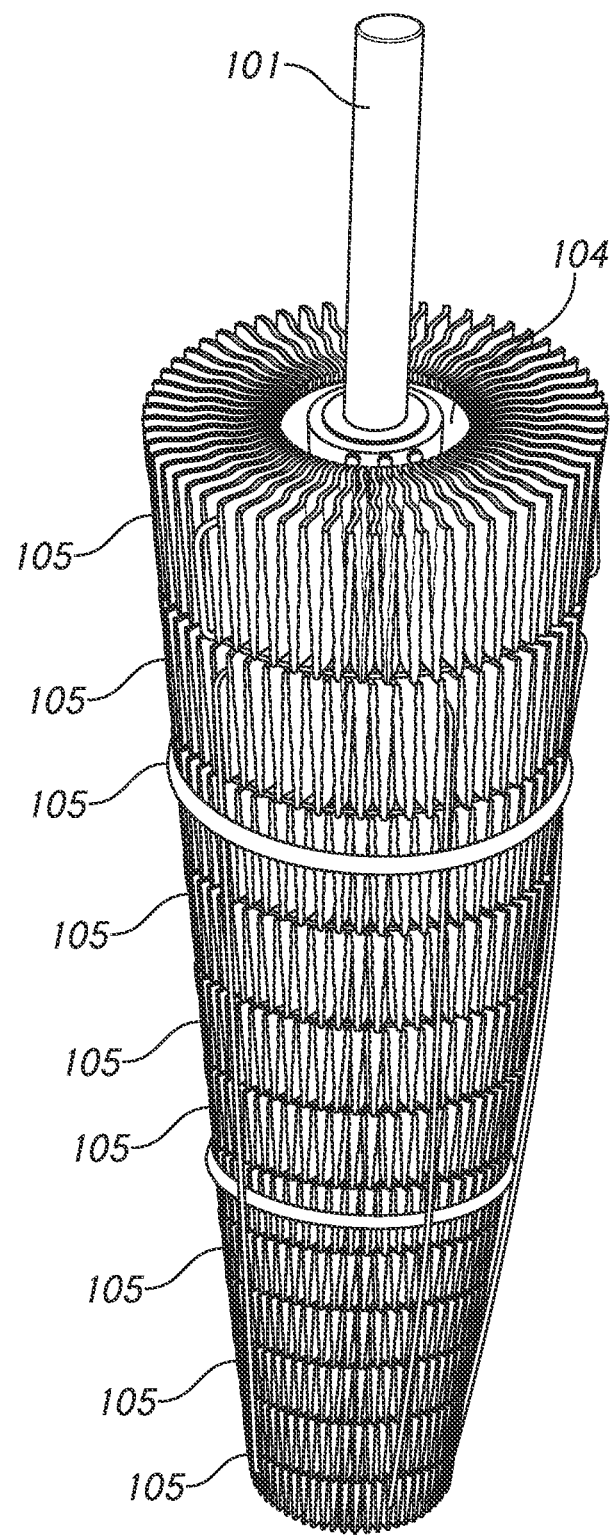

METHOD AND TOOL FOR INSTALLING REACTOR COMPONENTS

CROSS-REFERENCE TO RELATED APPLICATION

This application claims priority to provisional application 62/899,195, filed Sep. 12, 2019.

FIELD OF THE INVENTION

The invention relates to a tool for installing reactor components and its method of use.

BACKGROUND OF THE INVENTION

Reactor components for carrying out catalytic reactions, such as those used to produce syngas or hydrogen, can generally contact reactor tubes exposed to a heat source (for example, a furnace) to support reactions. In contrast, other types of reactions, such as exothermic reactions, can require a cooling source such as a cooling jacket. The reactor tubes can be loaded with various arrangements of catalyst-coated components, such as foil-supported or structured catalysts in the form of fans, fins, coils, foams, or monoliths. In some instances, the reactor catalyst-coated components can be expandable, such as those formed from foil, for example a fan. The reactor components are typically supported in sets of one or more components on a support. For example, the components may be stacked around an expandable center arrangement, which in turn comprises a, usually central, support.

One example of a reactor unit is a stackable structural reactor, or SSR, described in, for example, U.S. Pat Nos. 7,906,079, 8,721,973, and 9,751,073.

To improve heat transfer and fluid flow through a reactor, the fit of foil-supported catalysts can be enhanced. In a reactor tube, expandable catalyst-coated reactor components can be positioned to increase heat transfer, such as being located near the reactor wall exposed to a heating or cooling source. Thus, it is desirable to install and fit reactors with accessories to promote increased heat transfer and reactor efficiency, such as features that create turbulent and/or impingement fluid flow through the reactor components. As such, reactor components can occupy substantially all of the space within a reactor tube and/or press firmly against the interior wall of the reactor tube.

Installing reactor components is an important operation when assembling reactor units since installation of reactor components can cause damage, such as denting portions of the reactor tube or other components, such as the fins of a reactor. Other damage can be caused, for example, scratching or bending the reactors. It is important to avoid damaging reactor components on installation, as such damage can negatively affect performance, such as the heat transfer or reaction rate. Thus, there is a need to install reactor components in a reactor tube with a tool that avoids damaging the reactor components or tube.

U.S. Pat. No. 9,643,150 and U.S. Pat. Appl. Pub. No. 2017/0333865 describe reactor installation tools and methods for installing reactor components in a reactor tube. U.S. Pat. No. 9,643,150 teaches the use of a seal having a first end and a second end. The seal is preferably a skirt seal that contains a flexible (second) end for engaging an interior region of the reactor. Preferably, the flexible end of the seal flexes to cover an open interior region of the reactor such that the open interior region is exposed to the compressed gas outlet of the reactor installation tool and not to the atmosphere outside the reactor. By covering the open interior region of the reactor, the seal provides an isolated interior region that can be filled with compressed gas for purposes of positioning and expanding reactor components or the like. The interior region can be blocked at the opposite end of the reactor tube such that the seal closes the interior region. Thus, compressed gas passed into the interior region from the tool is trapped or contained in the region due to the seal blocking or reducing the ability of the compressed gas from escaping into the atmosphere outside the reactor. The elastic nature of the flexible end and the ability of the flexible end to expand into the cavity of the reactor ensures the interior region is sealed even during movement of reactor components, such as radial expansion.

Installing reactor components involves the reactor being shut down. There is a desire to improve the installation efficiency so as to minimize the downtime, and thus a need for simpler, more compact, user-friendly tools and methods that can reduce installation times and further improve installation reliability. For reactor installations utilizing skirt seals, it has been found to be difficult to insert the skirt seal into the interior region of a reactor due to the flexible nature of the flexible end of the skirt seal.

The present invention describes such installation tools and methods for improving ease of installation.

SUMMARY OF THE INVENTION

The invention includes a reactor installation device. The device comprises a flexible band, a first tab, a second tab, and a mechanical stop. The flexible band has a first end, a second end, a top edge and a bottom edge. The first tab is attached at or near the first end of the flexible band, the second tab is attached at or near the second end of the flexible band, and the both tabs are attached at or near the top edge of the flexible band. The mechanical stop is attached to the flexible band, the first tab, and/or the second tab, between the top edge and the bottom edge of the flexible band. The flexible band is capable of being bent into the shape of a circle by bringing the first and second tabs into contact. The invention also includes a method of inserting a skirt seal into a stackable structural reactor using the reactor installation device.

BRIEF DESCRIPTION OF THE DRAWINGS

FIG. 1 shows an embodiment of the reactor installation device of the invention.

FIG. 2 shows an embodiment of a skirt seal.

FIG. 3 shows an embodiment of a stackable structural reactor.

DETAILED DESCRIPTION OF THE INVENTION

The reactor installation device comprises a flexible band. The flexible band is preferably a flattened strip of a flexible material. The flexible material may be any material suitable for purpose, such as a plastic (eg, polyethylene or polypropylene), rubber, or flexible metal. A flexible metal such as aluminum is preferred.

The flexible band has a first end and a second end, and a top edge and a bottom edge. The first and second ends are located at opposite ends of the flexible band, preferably at the ends of the longest length of the flexible band. The top edge and bottom edge are located along the top and bottom lengths of the flexible band. The flexible band is preferably rectangular, or near-rectangular, in shape, wherein the top edge and bottom edge are located along the longest sides of the rectangular-shaped flexible band, and the first end and second end are located at the sides of the rectangle having the shortest length.

The installation device also comprises a first tab and second tab. The first tab is located at or near the first end of the flexible band. The second tab is located at or near the second end of the flexible band. The first and second tabs extend from one face of the flexible band, are preferably arranged to sit perpendicular to the top edge of the flexible band. One or both of the first and second tabs may also be arranged to be slightly angled from perpendicular to the top edge of the flexible band, such as within 20 degrees of perpendicular.

The first and second tabs may be made of the same material as the flexible band, and is preferably a metal such as aluminum. The tabs can be attached to the flexible band by any known means, including welding the tabs to the flexible band or molding the tabs to the flexible band.

The reactor installation device also comprises a mechanical stop. The mechanical stop is an additional tab that is attached to the flexible band, first band, and/or second tab, and located between the top edge and the bottom edge of the flexible band; preferably arranged about midway between the top edge and the bottom edge of the flexible band. The mechanical stop is preferably made of the same material as the flexible band, and is most preferably a metal such as aluminum. Preferably, the mechanical stop is attached to the second tab. The mechanical stop is preferably arranged to be parallel, or nearly parallel, to the top edge of the flexible band. The mechanical stop acts to prevent the reactor installation device from moving too far into an annular space of a stackable structural reactor.

The reactor installation device optionally comprises a clasp. The clasp is an additional tab that is attached to the flexible band at or near the top edge of the flexible band. The clasp allows an operator a gripping means on the reactor installation tool. The clasp may contain a loop within its structure to allow attachment of the reactor installation device to a pipe which can be used in combination with the reactor installation device. The clasp is preferably made of the same material as the flexible band, and is most preferably a metal such as aluminum.

The design and arrangement of the reactor installation device allows the flexible band to be bent into the shape of a circle by bringing the first and second tabs into contact. The tabs can be manually gripped and pressed together to compress the flexible band into a circular shape such that the reactor installation tool can encompass a skirt seal of an installation toolhead for insertion into a reactor.

The reactor installation device preferably further comprises a pipe. The pipe may be composed of metal, plastic, or any other suitable material. The pipe is designed to insert over the central support of a stackable structural reactor.

Preferably, the pipe and the reactor installation device are attached to each other by a securing means, such as a chain, rope, or lanyard, in order to keep them together for safekeeping. The pipe is preferably secured to the reactor installation device by attachment at the clasp on the flexible band. The pipe and reactor installation device do not have to be attached.

The purpose of the reactor installation device is to aid insertion of a skirt seal, which can be attached to an installation toolhead, into a stackable structural reactor (SSR).

A stackable structural reactor is a reactor system having a center support, reactor components arranged around or stacked on the center support, and an annular space between the center support and the reactor components.

The center support is preferably a central rod or mandrel, pipe, or post in the middle of the SSR.

The reactor components are preferably one or more components, more preferably multiple components, arranged around or stacked on the center support, to form a monolith of general annular cross section as viewed in the direction of flow of fluid through the reactor.

Materials of construction for the reactor components and center supports (as well as any other additional components, such as spring elements, inner and outer tubes) can include any suitable material as known in the art, for example, metal, non-ferrous metal, metal foil, steel, stainless steel, alloys, foils, non-metals such as plastics or glass, ceramic, or combinations thereof.

When the SSR is placed within an outer tube of a reactor system (eg, a reformer), the outer tube has an inner wall surface and an outer wall surface, such as a reformer tube. The diameter of the outer tube is preferably constant along its entire length. In the case of reformer tubes, portions of the tube can have a larger diameter and create bulges or expanded portions in the outer tube.

The reactor components may be constructed to have a central opening for receiving the center support and optionally center section components as well, such as an expandable center arrangement, such that the reactor components can be stacked or arranged on the center support between the outer tube and the expandable center arrangement.

When placed in an outer tube of a reactor system, the center support preferably has a length to accommodate the length of the outer tube. The center support preferably has a bracket, bushing, base plate or the like for providing a stop fitting so the reactor components, such as a fan or monolith, do not slide off the end of the center support. A base plate can be located at or near the bottom end of the center support and can have a shape and diameter or dimensions to permit ease of install in the outer tube. For instance, the baseplate can have a circular shape with a diameter about the same or less than the inner diameter of the outer tube.

The center support is preferably preloaded with any number of reactor components. The reactor components can be stacked vertically, one on top of another, to form layers of reactor components, either vertically or in alternative ways such as horizontal to accommodate orientation of a reactor or certain technology requirements. Washers are preferably inserted between one or more reactor components (e.g., fans) as desired, for example, each fan can be separated by a washer wherein the washer creates an open space between the components. Stacked reactor components, which have a typical height in the range 8 mm to 100 mm, can be arranged vertically as desired to create a subassembly with height in the range 15 cm to 1.5 m.

The section of the center support preferably extends beyond one end of the preloaded reactor components, thus providing a protruding portion that can be gripped during installation of the SSR into an outer tube.

The reactor components can be, for example, fans or monoliths, either used with or without washers. Preferably, the reactor components can be catalyst supports, such as fans, coils or monoliths having one or more catalyst coatings. Washers used in connection with the components can also have a catalyst coating to effectively distribute catalyst contact with the fluid flowing through the reactor. Catalytic material is known in the art and can include nickel, palladium, platinum, zirconium, rhodium, ruthenium, iridium, cobalt and oxides of aluminum, cerium, and zirconium.

The reactor components can be expandable in the radial direction such that the supports can be pushed outward radially to the outer tube, when installed in an outer tube. The components, when expandable and in the collapsed state, have a diameter less than the outer tube. In the expanded position, the components can be in direct contact with the outer tube or create a small gap between the outer tube and the outer diameter face of the components. The gap between the outer edge diameter face of the reactor components and the inner wall surface of the outer tube can be at least 0.2, 0.5, 1, 2, 3, 5, 10 or 15 mm. The gap is preferably not more than 3, 6, 10, 15, 20 or 25 mm and preferably in the range of 0.5 to 6 mm, and more preferably 1 to 3 mm. The gap promotes heat transfer and forces fluid flow traveling toward the inner wall surface of the outer tube to be directed back towards the inner portion of the reactor. Spacers, such as a washer, wire, ring, loop or the like, can be used to ensure desirable gap spacing between the outer diameter edge or face of the monoliths or fans and the inner wall surface of the outer tube. Fluid, such as gas or liquid, to be reacted generally flows vertically, either up-flow or down-flow as desired, through the outer tube and through each component arranged on the center support. Reactor components direct fluid flow in other non-vertical directions to increase heat transfer, for example fans can direct or guide fluid flow radially (perpendicular to the overall vertical direction) towards the outer tube wall. While the above description has referred to vertical flow, which is typically used, the invention can also be used with horizontal (or other orientation) flow reactors. Such reactors orientations may in particular be used when structured catalyst elements are employed since such elements may be more easily retained in a horizontal geometry than, say, catalyst pellets.

The stackable structural reactor has an annular space between the center support and the reactor components. In a preferred arrangement, the annular space is created by an expandable center arrangement such as an expansion tube. An expandable center arrangement is described in U.S. Pat. No. 10,099,198, the teachings of which are incorporated herein by reference in their entirety.

A skirt seal for use in the method of the invention preferably comprises a first seal end and a second seal end. The second seal end is preferably made up of two or more frayed tubes. The tubes can be cut at multiple locations at one end so that the tubes can fan out to provide a flat circular ring that extends outward from the first seal end. The cuts can be equally spaced around the diameter of one end of the tube and any number of cuts can be made as desired. The cuts can extend upward at any distance, for example, the cuts can extend along the tube to the first seal end. The flexible nature of the second seal end and its ability to expand into the annular space of the SSR ensures the interior region is sealed even during movement of SSR reactor components, such as radial expansion.

The first seal end of the skirt seal preferably comprises a ring, preferably made of metal, having an inner diameter surface and an outer diameter surface. The ring can have dimensions to tightly fit into the opening in a seal housing of an installation toolkit, such as that described in U.S. Pat. Appl. Pub. No. 2017/0333865, the teachings of which are incorporated herein by reference in their entirety. The ring preferably has a groove along is outer diameter surface that can be utilized to fit a rubber 0-ring for creating an air-tight seal between the ring and seal housing of an installation toolkit. The ring can further include grooves or notches for accommodating a clamp in the seal housing. In another embodiment, the ring can be threaded and screwed into the seal housing for securing the seal to the installation toolkit. In yet another embodiment, the ring of the first seal end can be secured to the toolkit seal housing by using a clip arrangement.

The tubes of the second seal end can be secured to the first seal end by slipping one end of the tube over a portion of the ring of the first seal end. To secure the first and second seal ends together, the section of the tube overlaying the portion of the ring of the first seal end can be glued onto or adhered to the ring. Alternatively or in addition, an outer band can be positioned around the tube and ring portion of the first seal end. The outer band is preferably made from rubber or an elastic material such that the outer band can press against the tube of the second seal end and ring portion of the first seal end for purposes of ensuring the outer tube does not detach or slip off of the ring.

The second seal end of the skirt seal is flexible for engaging the annular space of the SSR. Preferably, the second seal end flexes to cover the annular space of the open SSR such that the annular space can be exposed to a compressed gas outlet of an installation toolkit and not to the atmosphere outside the SSR. By covering the top of the annular space (open interior region) of the SSR, the skirt seal provides an isolated interior region that can be filled with compressed gas for purposes of positioning and expanding reactor components or the like. The interior region can be blocked at the opposite end of the SSR such that the skirt seal closes the annular space interior region. Thus, the compressed gas passed into the annular space is trapped or contained in the region due to the seal blocking or reducing the ability of the compressed gas from escaping into the atmosphere outside the SSR.

The reactor installation device of the invention aids insertion of the skirt seal by preventing contact between the reactor components and the skirt seal until the seal is inserted. The reactor installation device is especially effective for SSR units that utilize an expansion tube or sleeve that is attached to the center support of the SSR unit. In these arrangements, an expansion sleeve is attached to the center support and is designed to push the reactor components in place against the outer tube of the reactor unit. When an expansion sleeve is utilized, the annular gap within the SSR is located between the center support and on the outer edge by a cylindrical wrap of metal foil known as the expansion sleeve.

The reactor installation tool of the invention is separate from the skirt seal, and neither the reactor installation tool nor the skirt seal remain within the stackable structural reactor after loading. After insertion of the skirt seal, the skirt seal may be attached to the installation toolhead as described in U.S. Pat. Appl. Pub. No. 2017/0333865. Alternatively, the skirt seal may be attached to the installation toolhead prior to insertion of the skirt seal into the SSR.

The method of the invention comprises first providing a stackable structural reactor having a center support, reactor components position between the center support and the outer tube, and an annular space between the center support and the reactor components; and providing a skirt seal. The method then comprises placing the reactor installation tool of the invention against the skirt seal, and then squeezing the first tab and the second tab of the reactor installation device to cause the reactor installation device to encompass the skirt seal such that the skirt seal can fit in the annular space of the SSR. The encompassed skirt seal is then pushed into the annular space from the bottom edge of the reactor installation tool. The reactor installation tool is then removed from the skirt seal, and the skirt seal is then optionally further pushed into the annular space as necessary.

The method may additionally comprise covering the center support with a pipe prior to pushing the skirt seal into the annular space from the bottom edge of the reactor installation tool.

Both the center pipe and reactor components (or expandable center arrangement if utilized) provide obstacles for proper insertion of the skirt seal, as the skirt seal is made of rubber sheets that are flexible and get easily caught on either edge. The current method of installation is typically by hand which is time consuming and difficult. The reactor installation device and method of the invention significantly reduces the difficulty and therefore time taken to accomplish this action.

FIG. 1 illustrates a preferred embodiment of the reactor installation tool. The reactor installation tool is composed of a flexible band (1), that has a first tab (5) and a second tab (3) attached to the flexible band. The first tab (5) is located near the first end (22) of the flexible band, and the second tab (3) is located at the second end (21) of the flexible band. The flexible band is preferably composed of a flexible aluminium metal strip, in which the first tab and second tab are welded to the flexible band. The tabs are also preferably aluminium metal. A mechanical stop (4) is shown as attached to the second tab (3). The mechanical stop (4) is designed to prevent the reactor installation tool from disappearing down into the stackable structural reactor. The two tabs shown at opposite ends of the flexible band allow for forming of the band into a cylindrical wrap to be wrapped around the skirt seal. The angled form of the first tab (5) allows for ease of removal of the skirt seal applicator assembly, by making this tab easier for the operator to grip. Optional clasp (2) is an optional additional tab that allows the operator to hold the tab during removal. The foil has a bottom edge (32) that is the insertion side of the device, while the top edge (31) is the extraction side of the device. The bottom edge (32) is preferably curved inward to allow easier insertion into the SSR stack.

An embodiment of the skirt seal is shown in FIG. 2. The skirt seal (9) preferably has a first seal end (9a) and a second seal end (9b), wherein the first seal end can be used to releasably secure an installation toolkit such as that described in U.S. Pat. Appl. Pub. No. 2017/0333865, the teachings of which are incorporated herein by reference in their entirety. The first seal end (9a) is typically circular in shape. The first end can have a groove along is outer diameter surface that fits a rubber O-ring (10) for creating an air-tight seal between the 0-ring and seal housing of the installation toolkit.

The second seal end (9b) is preferably made up of two or more frayed tubes. The tubes can be cut (12) at multiple locations at one end so the end can fan out to provide a flat circular ring that extends outward from the ring of the first seal end. The cuts can be equally spaced around the diameter of one end of the tube and any number of cuts can be made as desired. The cuts can extend upward at any distance, for example, the cuts (12) can extend along the tube to the first end of the seal, such as the section of the tube that overlays the outer band or ring (11) of the first end. The flexible nature of the second end of the skirt seal and its ability to expand into the annular space of the SSR ensures the interior region is sealed even during movement of reactor components, such as radial expansion.

The tube of the second seal end (9b) is secured to the first end (9a) by means of an outer band or ring (11). The outer band secures the first end and the second end together by adhering the tube of the second seal end to the outer band (11). The outer band (11) is preferably made from rubber or an elastic material such that the band can press against the tube of the second end and ring portion of the first end for purposes of ensuring the tube does not detach or slip off of the ring.

FIG. 3 illustrates an embodiment of the stackable structural reactor, showing multiple reactor components (105) mounted on a center support (101). The annular space (104) between the center support and the reactor components is shown as being occupied by an expansion tube, the top of which is showing.

We claim:

1. A reactor installation device comprising a flexible band, a first tab, a second tab, and a mechanical stop, wherein:
    (a) the flexible band has a first end, a second end, a top edge and a bottom edge;
    (b) the first tab is attached at or near the first end of the flexible band, the second tab is attached at or near the second end of the flexible band, and the first and second tabs are attached at or near the top edge of the flexible band;
    (c) the mechanical stop is attached to the flexible band, the first tab, and/or the second tab, between the top edge and the bottom edge of the flexible band;
    wherein the reactor installation device has an arrangement that allows the flexible band to be bent into the shape of a circle by bringing the first and second tabs into contact.

2. The reactor installation device of claim 1 further comprising a pipe for encompassing the center support of a stackable structural reactor.

3. The reactor installation device of claim 2 wherein the flexible band and the pipe are attached by a securing means.

4. The reactor installation device of claim 2 wherein the flexible band and the pipe are unattached.

5. The reactor installation device of claim 1 further comprising a clasp that is attached at or near the top edge of the flexible band.

6. The reactor installation device of claim 1 wherein bottom edge of the flexible band is curved inward.

7. A method of inserting a flexible seal into a stackable structure reactor, the method comprising:
    (a) providing a stackable structural reactor having a center support, reactor components arranged around or stacked on the center support, and an annular space between the center support and the reactor components;
    (b) providing a skirt seal;
    (c) contacting the reactor installation device of claim 1 with the skirt seal, and bringing the first tab and the second tab of the reactor installation device into contact with each other to encompass the skirt seal such that the diameter of the encompassed skirt seal is minimized to a size small enough to fit into the annular space;
    (d) pushing the encompassed skirt seal into the annular space from the bottom edge of the reactor installation tool;
    (e) removing the reactor installation tool from the skirt seal; and
    (f) optionally, pushing the skirt seal further into the annular space as necessary.

8. The method of claim 7 which further comprises covering the center support with a pipe prior to step (d).

* * * * *